(12) United States Patent
Iwata et al.

(10) Patent No.: US 7,613,114 B2
(45) Date of Patent: Nov. 3, 2009

(54) PACKET SCHEDULING APPARATUS

(75) Inventors: Atsushi Iwata, Tokyo (JP); Yoshiaki Shiota, Tokyo (JP)

(73) Assignee: NEC Corporation, Tokyo (JP)

( * ) Notice: Subject to any disclaimer, the term of this patent is extended or adjusted under 35 U.S.C. 154(b) by 1149 days.

(21) Appl. No.: 10/276,545

(22) PCT Filed: Jun. 28, 2001

(86) PCT No.: PCT/JP01/05583

§ 371 (c)(1),
(2), (4) Date: Nov. 18, 2002

(87) PCT Pub. No.: WO02/01821

PCT Pub. Date: Jan. 3, 2002

(65) Prior Publication Data

US 2004/0114516 A1 Jun. 17, 2004

(30) Foreign Application Priority Data

Jun. 29, 2000 (JP) .......................... 2000-195831

(51) Int. Cl.
*G01R 31/08* (2006.01)
(52) U.S. Cl. ........................ 370/235; 370/412
(58) Field of Classification Search ............ 370/230.1, 370/235, 252, 412, 465, 473, 474, 230
See application file for complete search history.

(56) References Cited

U.S. PATENT DOCUMENTS 5,271,000 A * 12/1993 Engbersen et al. ......... 370/244
5,497,371 A * 3/1996 Ellis et al. ................. 370/412
5,790,522 A * 8/1998 Fichou et al. ............. 370/236

(Continued)

FOREIGN PATENT DOCUMENTS

JP 62-114356 5/1987

(Continued)

OTHER PUBLICATIONS

San Jose "Quality of Service for voice over IP Solutions Guide, Ver 1.0" (1999), Cisco Systems (US), Chapter 2, pp. 22-30.

(Continued)

*Primary Examiner*—Ricky Ngo
*Assistant Examiner*—Christine Ng
(74) *Attorney, Agent, or Firm*—Dickstein Shapiro LLP

(57) ABSTRACT

A packet scheduling apparatus which decreases a transmission delay and a transmission jitter of a premium packet which occur by transmitting a low priority packet and which efficiently transmits the low priority packet is provided. The apparatus includes a packet input section 1, a packet queue group 2, a scheduler section 3, a packet dividing section 4, a packet output section 5 and a packet buffer 6. The packet queue group 2 includes a premium packet queue 21 and a low priority packet queue 22. In addition, the scheduler section 3 includes a scheduling queue 31 and a scheduler 32. The "low priority packet" which influences the transmission of the "premium packet" is divided into a plurality of packets each having a length which falls within a transmission interval of the "premium packet" by the packet dividing section 4, and scheduled dynamically based on the transmission interval or load state of the "premium packet".

6 Claims, 6 Drawing Sheets

U.S. PATENT DOCUMENTS

| | | | |
|---|---|---|---|
| 5,959,677 A * | 9/1999 | Date et al. | 375/240.01 |
| 6,411,617 B1 * | 6/2002 | Kilkki et al. | 370/353 |
| 6,421,720 B2 * | 7/2002 | Fitzgerald | 709/224 |
| 6,483,846 B1 * | 11/2002 | Huang et al. | 370/445 |
| 6,490,611 B1 * | 12/2002 | Shen et al. | 718/103 |

FOREIGN PATENT DOCUMENTS

| | | |
|---|---|---|
| JP | 1-162036 | 6/1989 |
| JP | 1-284042 | 11/1989 |
| JP | 9-46373 | 2/1997 |
| JP | 9-83547 | 3/1997 |
| JP | 9-149051 | 6/1997 |
| JP | 10-164136 | 6/1998 |
| JP | 11-17702 | 1/1999 |
| JP | 11-68787 | 3/1999 |
| JP | 11-215140 | 8/1999 |
| JP | 11-261634 | 9/1999 |
| JP | 11-275116 | 10/1999 |
| JP | 11-308229 | 11/1999 |
| JP | 2000-151703 | 5/2000 |
| JP | 2001-53805 | 2/2001 |

OTHER PUBLICATIONS

Japanese Office Action dated Apr. 8, 2004 (and English translation of relevant portion).

* cited by examiner

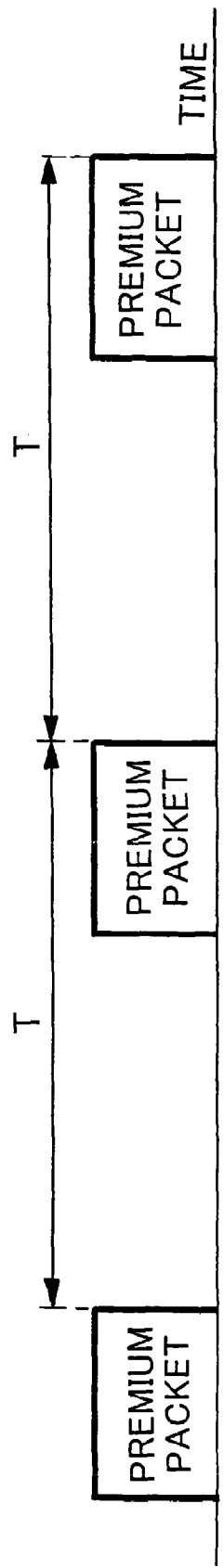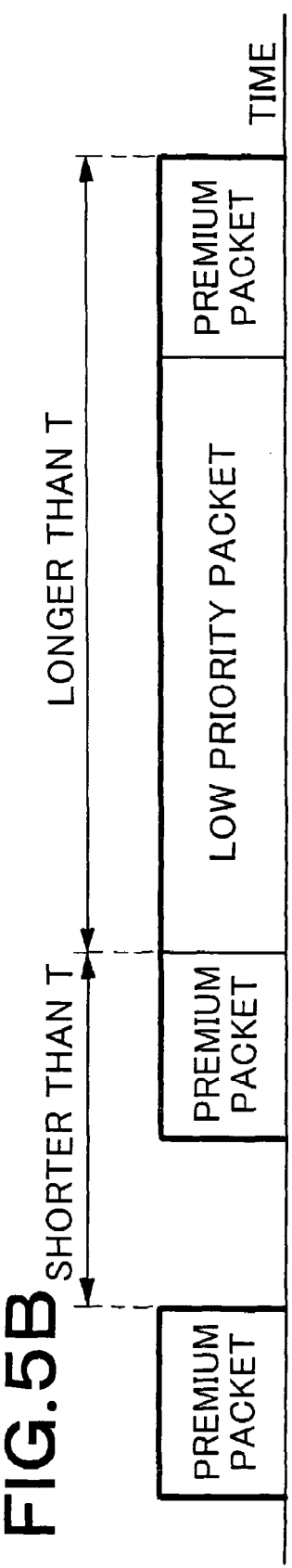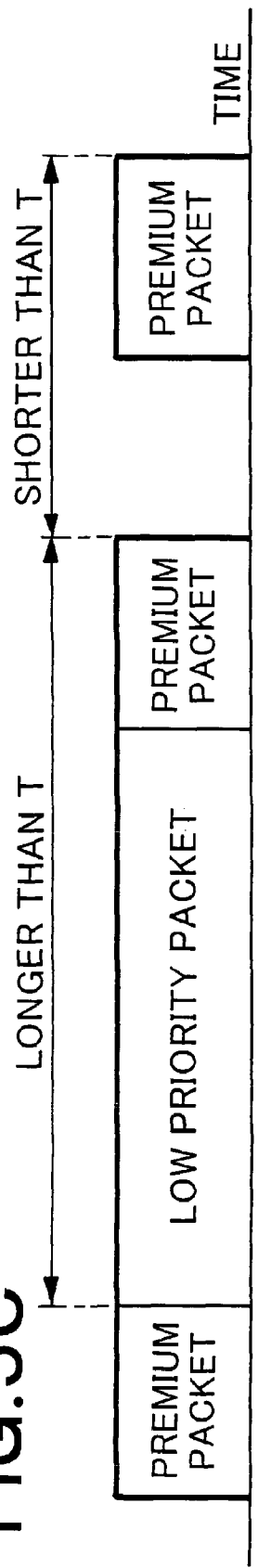

FIG.6

| Version | IHL | Type of Service | Total Length | |
|---|---|---|---|---|
| Identification | | | Flags | Fragment Offset |
| Time to Live | | Protocol | Header Checksum | |
| Source Address | | | | |
| Destination Address | | | | |
| Options | | | | Padding |

PACKET SCHEDULING APPARATUS

TECHNICAL FIELD

The present invention relates to a packet scheduling apparatus and particularly relates to a scheduling apparatus for a premium packet of a voice or a motion picture which requires real time transmission (control).

BACKGROUND ART

The conventional art will be described while taking an IP (Internet Protocol) packet which is switched on the Internet as an example.

An IP packet traffic is referred to as a best effort type traffic, for which quality of service (QOS: Quality of Service) guarantee is not specified unlike the ATM network. However, following a recent increase in Internet traffic, demand for guaranteeing QOS even for the IP packet traffic is gradually rising. In this background, there is a fact that it is difficult for a multimedia application which requires such real time characteristic as those of telephone communication and motion pictures to keep sufficient communication quality on the conventional best effort type network.

As one of QOS guarantee mechanisms for the IP network, there is known "a packet scheduler". This means that a network node which performs packet switching, classifies input packets into a plurality of queues, the scheduler schedules each queue in accordance with a preset priority or weight and controls packet transmission from each queue. A packet scheduler of this type is disclosed in, for example, JP 11-261634A entitled "Packet Scheduling Control Method", JP 11-275116A entitled "Traffic Control Method for Providing Predictive/Guaranteed Service", JP 9-83547A entitled "Packet Scheduling Apparatus" and the like.

However, an IP packet has a variable length. It is assumed herein that in an environment in which packets (to be referred to as "premium packets" hereinafter) which belong to a premium traffic which is required to be processed in real time and packets (to be referred to as "low priority packets" hereinafter) which is not required to be processed in real time are mingled, the "premium packets" occupy most of the traffic. In this case, if a conventional scheduler starts transmitting a low priority long packet which has a large packet length, a packet which belongs to multimedia traffic which should be transmitted with the highest priority cannot be transmitted until the low priority packet has been transmitted. Therefore, the conventional scheduler has a problem that real time characteristic is deteriorated.

This problem will be described with reference to an example of FIG. 5. In FIG. 5(A), respective "premium packets" have a fixed length and transmitted at constant transmission intervals T's. Now, as shown in FIGS. 5(B) and 5(C), if a "low priority packet" of which the transmission time exceeds T is to be transmitted, the transmission of the "premium packets" is shifted before or after that of the "low priority packet". Therefore, a fluctuation of the delay of "premium packets" occurs, which may possibly deteriorate real time characteristic.

This problem is normally expressed as an occurrence of a transmission delay and an occurence of a transmission jitter (a fluctuation of transmission delay) to the "premium packets". If the transmission intervals of "premium packets" is short on a low rate line, this problem becomes more conspicuous. Conversely, if a "low priority packet" scheduling is executed so as not to influence the transmission of the "premium packets", a problem occurs that the "low priority packet" which has a large packet length is not processed forever.

To solve these problems, a method for dividing a "low priority packet" into a plurality of short packets, and transmitting the short packets at idle times between the times at which "premium packets" are transmitted, is proposed in "Cisco Systems, Quality of Service for Voice over IP Solutions Guide, Ver 1.0, CHAPTER 2, pp. 22-32". According to the method proposed therein, it is recommended that the length of each of the divided packets is determined according to a line rate, and a node performs a packet division processing based on the determined length.

Generally, however, the load of a line is not fixed but always varies. According to the conventionally proposed method, the low priority packet which is input into the node is divided into a plurality of packets each having a fixed length irrespectively of the magnitude of the load. If the load is light, the transmission interval of the "premium packets" is long and the "low priority packet" is, therefore, divided into a plurality of packets despite no need to do so. On the other hand, if the load is heavy and each of the "low priority packets" divided to have a fixed length is long, then the transmission of the "premium packets" may be influenced by the "low priority packets".

The header format of an IP packet is shown in FIG. 6. The header format includes the following header fields.

| | |
|---|---|
| Version: 4 bits | Version Field |
| IHL: 4 bits | Internet Header Length Field |
| Type of Service: 8 bits | Type of Service Field |
| Total Length: 16 bits | Packet Length field |
| Identification: 16 bits | Recognition Field |
| Flags: 3 bits | Control Flag Field |
| Fragment Offset: 13 bits | Fragment Offset Field |
| Time to Live: 8 bits | The number of routers through which the IP packet can be passed |
| Protocol: 8 bits | Protocol Field |
| Header Checksum: 16 bits | Header Checksum Field |
| Source Address: 32 bits | Destination Address Field |
| Destination address: 32 bits | Source Address Field |
| Options: variable | Option Field |
| Padding: variable | Padding Field |

DISCLOSURE OF THE INVENTION

The problems of the above-stated conventional art are as follows: Even if a "low priority packet" is divided, the transmission delay and transmission jitter of a "premium packet" may possibly occur. This is because the length of each of the divided packets divided from the "low priority packet" is determined according to the line rate without considering the load of the line. The other problem is that even if the load of the line is light, the "low priority packet" is divided. The reason is the same as above.

It is, therefore, an object of the present invention to provide a packet scheduling apparatus which can reduce the transmission delay and transmission jitter of "premium packets" and efficiently transfer "low priority packets" in the spaces between the "premium packets".

A packet scheduling apparatus according to the present invention for scheduling traffic in which a premium packet, such as a voice or a motion picture, belonging to premium traffic which requires real time characteristic and a low priority packet belonging to low priority traffic which does not require the real time characteristic are mingled, comprises: a packet input section into which the packets are input; a packet buffer to which the packets received by the packet input section are written; a packet queue group which classifies the packets from the packet input section into traffic classes to which respective packets belong and queues the packets in a premium packet queue and a low priority packet queue; a packet dividing section which divides the low priority packet; a scheduler section which schedules the packets; and a packet output section which reads the packets scheduled by the scheduler section from the packet buffer, and transmits the scheduled packets.

Further, according to a preferred embodiment of the packet scheduling apparatus of the present invention, the packet queue group includes the premium packet queue and the low priority packet queue which hold, as data, pointer groups for the premium packets and the low priority packets received from the packet input section, respectively. The scheduler section includes a scheduling queue in which information on the scheduled packets is queued, and a scheduler which performs scheduling for transmitting the packets based on information received from the packet input section and information received from the packet dividing section. The scheduler holds a maximum transmission rate which is set to the premium packet queue of the packet queue group in advance. The packet input section notifies the scheduler of information as to which queue a pointer is transmitted to, a length of each of the packets and the pointer. The scheduler section further comprises a load monitoring section which monitors a load which is a rate at which the premium packet occupies an output band of the packet output section, on the basis of information on the premium packet input into the scheduler, and which notifies the scheduler of the load. The scheduler section further comprises a packet quality monitoring section which notifies the scheduler of a request to change the existing scheduling if the premium packet is input into the packet queue section and it is determined that the low priority packet which has been already scheduled causes a delay or a delay jitter in transmission of the premium packet and deteriorates a required quality of the premium packet.

Moreover, according to another embodiment of the packet scheduling apparatus of the present invention, the packet scheduling apparatus for executing scheduling of traffic in which a premium packet, such as a voice or a motion picture, belonging to premium traffic which requires real time characteristic and a low priority packet belonging to low priority traffic which does not require the real time characteristic are mingled, the packet scheduling apparatus comprises: means for queuing the scheduled packets in a scheduling queue; and means for queuing the low priority packet to an end of the scheduling queue, and characterized by including, for the scheduling of the premium packet, means for determining whether or not the low priority packet which has been already queued to the end of the scheduling queue causes a delay and a transmission jitter in transmission of the premium packet; means for queuing the low priority packet to the end of the scheduling queue if the low priority packet does not cause the delay and the transmission jitter in the transmission of the premium packets; and means for obtaining a length of the low priority packet which does not cause the delay and the transmission jitter, dividing data from a top of the low priority packet according to this length, re-queuing the low priority packet in the scheduling queue, and queuing the premium packet and the low priority packet remaining after dividing the data in the scheduling queue in this order if the low priority packet causes the delay and the transmission jitter.

Moreover, according to another embodiment of the packet scheduling apparatus of the present invention, the packet scheduling apparatus for executing scheduling of traffic in which premium packets, such as a voice or a motion picture, belonging to premium traffic which requires real time characteristic and a low priority packet belonging to low priority traffic which does not require the real time characteristic are mingled, the apparatus comprises: means for always monitoring a rate or a load at which the packet belonging to the premium traffic occupies a band of an output link of the apparatus; means for queuing the scheduled packets in a scheduling queue; and means for queuing the premium packet to an end of the scheduling queue, and characterized by comprising means for dividing a packet having a length determined according to the load in advance from the low priority packet and queuing the divided packet in the scheduling queue if the load of the packet belonging to the premium traffic is heavy and the packet belonging to the low priority traffic is received; and means for repeating a processing for queuing the low priority packet remaining after dividing the packet and the packet belonging to the premium traffic in the scheduling queue until a plurality of divided packets are not present.

As can be understood from the above description, the packet scheduling apparatus of the present invention can attain the following practically, notable advantages. The first advantage is that the transmission delay and transmission jitter of the "premium packet" which occur by transmitting the "low priority packet" while the load of the "premium packet" is heavy are decreased. The reason is as follows. The "low priority packet" which requires longer transmission time than the transmission interval of the "premium packet" is divided and scheduled. The length of the divided packet is determined so as not to influence the transmission of the "premium packet" or is dynamically calculated according to a load state.

The next advantage is that the "low priority packet" is not unnecessarily divided. The reason is the same as the above.

BRIEF DESCRIPTION OF DRAWINGS

FIG. 5 is a diagram showing an example in which a premium packet transmission delay occurs.

FIG. 6 is a diagram showing an ordinary IP packet header.

BEST MODES FOR CARRYING OUT THE INVENTION

The configurations and operations of preferred embodiments of a packet scheduling apparatus according to the present invention will be described hereinafter in detail with reference to the accompanying drawings.

Figure 1:
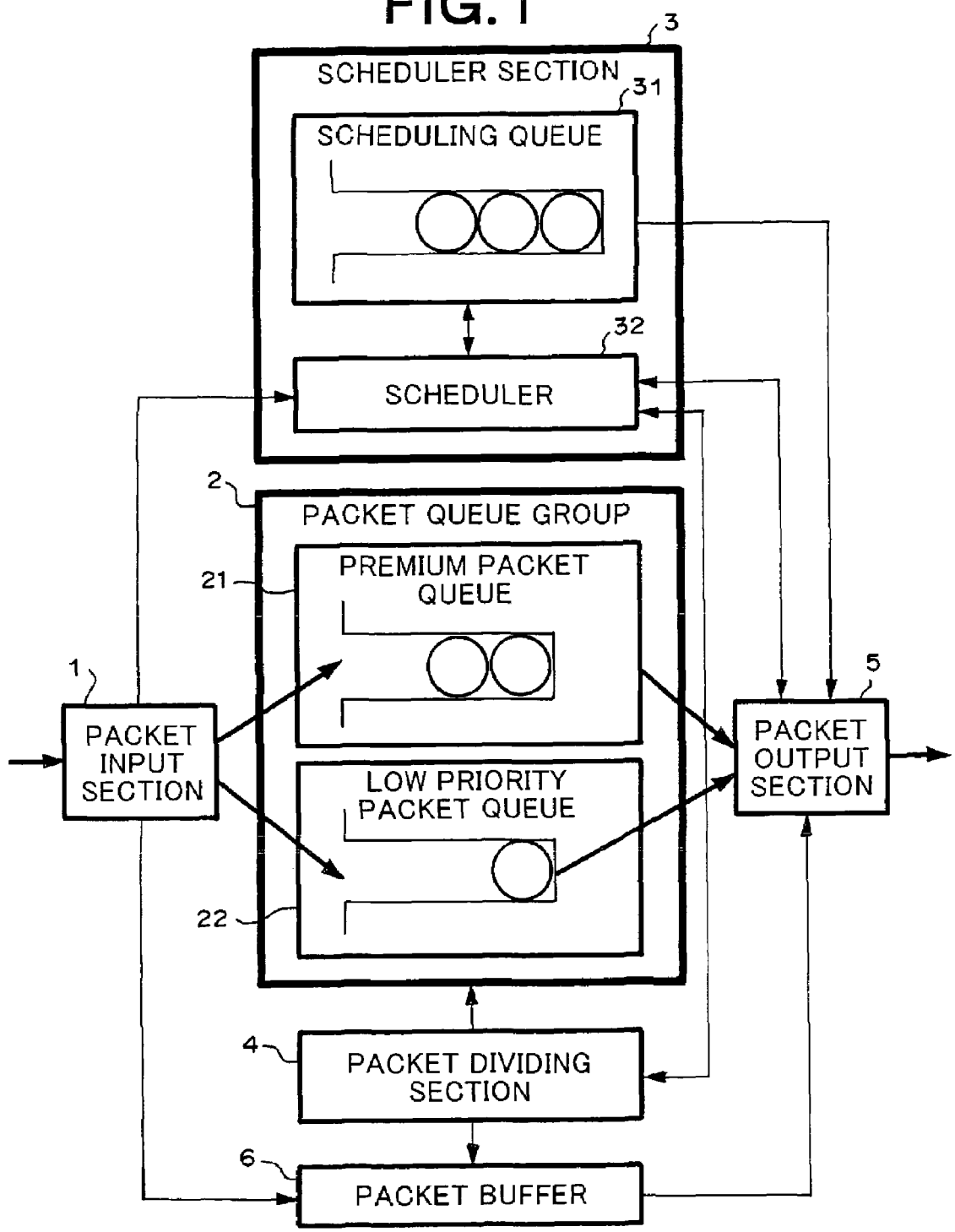
FIG. 1 is a block diagram showing the configuration of a first embodiment of a packet scheduling apparatus according to the present invention.

First, FIG. 1 is a block diagram showing the configuration of the first embodiment of the packet scheduling apparatus according to the present invention. This packet scheduling apparatus comprises a packet input section 1, a packet queue group 2, a scheduler section 3, a packet dividing section 4, a packet output section 5 and a packet buffer 6. The packet queue group 2 includes a premium packet queue 21 and a low priority packet queue 22. In addition, the scheduler section 3 includes a scheduling queue 31 and a scheduler 32.

The packet input section 1 writes an input IP packet to the packet buffer 6 and, at the same time, fetches and checks the header part of the IP packet. The packet is classified to a class to which the packet belongs and a pointer which indicates a location in the packet buffer 6 to which the packet is written is transmitted to the corresponding queue in the packet queue group 2. In addition, the scheduler 32 is notified of information as to which queue the pointer is transmitted to, the length of the packet and the pointer.

Further, the premium packet queue 21 and the low priority packet queue 22 included in the packet queue group 2 hold pointer groups received from the packet input section 1 as data, respectively. The data received from the packet input section 1 is queued at the end of each queue. Further, each queue transmits data at the top of the queue to the packet output section 5 in response to an instruction from the packet output section 5. Furthermore, a highest packet transmission rate is set to the premium packet queue 21 in advance and information on this rate is held in the scheduler 32.

The scheduler 32 of the scheduler section 3 performs scheduling to transmit packets based on the information received from the packet input section 1. Information on the packet which has been scheduled is queued in the scheduling queue 31. Information as to which queue in the packet queue group 2 to which the packet belongs, packet transmission start time and the length of the packet are written to each queued data.

On the other hand, information on a queue to which the packet at the top of the scheduling queue 31 included in the scheduler section 3 belongs (or a queue from which the packet output section 5 reads data next) is notified to the packet output section 5 at the transmission start time. If it is discovered from the scheduling performed by the scheduler 32 that the transmission of a low priority packet influences the transmission of a "premier packet", the scheduler 32 pays attention to the "low priority packet" in the scheduling queue 31 and calculates the length of a packet divided from the low priority packet which does not influence the transmission time of the "premium packet". The scheduler 32 reschedules the "low priority packets" divided based on the calculated value and the "premium packet". Thereafter, the scheduler 32 actually instructs the packet dividing section 4 to divide the "low priority packet".

In response to the instruction of the scheduler 32, the packet dividing section 4 divides a packet in the packet buffer 6 and divides pointer data in the low priority packet queue 22. The packet output section 5 reads pointer data from the corresponding queue in the packet queue group 2 based on information on the queue to be read next from the scheduler 32, reads the corresponding packet from the packet buffer 6 and transmits the read packet. When the transmission of the packet is completed, the packet dividing section 4 notifies the corresponding queue in the packet queue group 2 and the scheduler 32 of the completion of data read.

Next, the operation of the packet scheduling apparatus according to the present invention as shown in FIG. 1 will be described. The packet input section 1 writes an input IP packet to the packet buffer 6 and, at the same time, fetches the header of the packet. At this moment, the packet input section 1 checks the header of the IP packet and classifies the packet to a traffic class (premium or low priority) to which the packet belongs. The classification is executed by, for example, using the TOS (Type of Service) field in the IP header. When the classification is completed, the packet input section 1 transmits a pointer which indicates a location in the packet buffer 6, to which the packet has been written, to the queue in the packet queue group 2 which corresponds to the traffic class as the class information. In addition, the packet input section 1 notifies the scheduler 32 of information as to which queue the pointer has been transmitted to and the length of the packet.

Next, scheduling performed by the scheduler section 3 will be described in detail. If the information which the scheduler 32 receives from the packet input section 1 is on a low priority packet, the scheduler section 3 calculates the transmission start time of the low priority packet, and queues, as one piece of data, information representing that the packet is a "low priority packet" (information as to which queue in the packet queue group the packet belongs to), the transmission start time information and information on the length of the packet, at the end of the scheduling queue 31.

Figure 2:
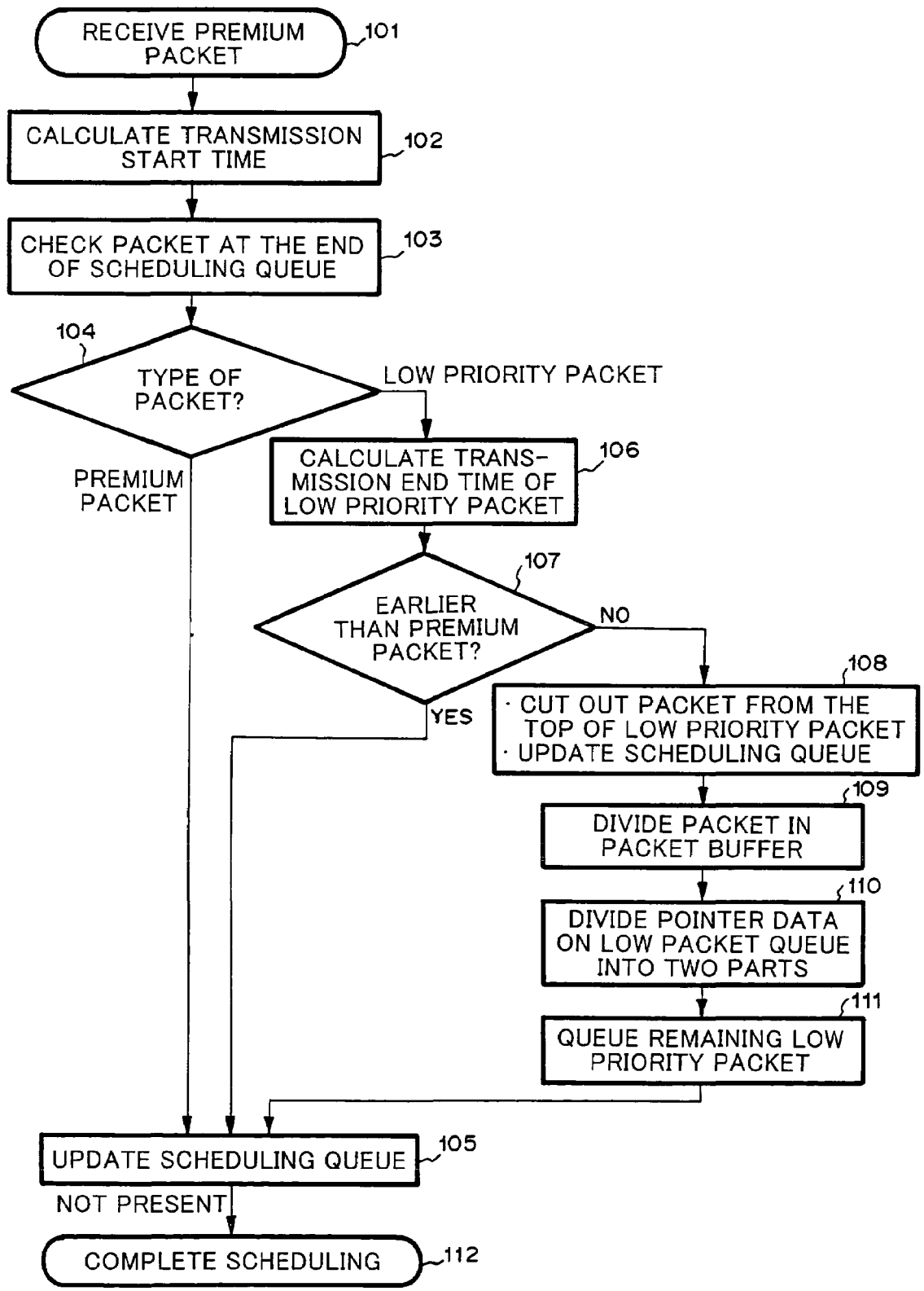
FIG. 2 is a flow chart for explaining the operation of the packet scheduling apparatus shown in FIG. 1.

A case where the information which the scheduler 32 receives from the packet input section 1 is on a "premium packet" (step 101) will be described with reference to the flow chart of FIG. 2. The scheduler section 3 calculates the transmission start time of the received "premium packet" based on the highest packet transmission rate preset to the premium packet queue 21 in advance and the packet length information received from the packet input section 1 as well as the transmission start time and packet length of the previously scheduled "premium packet" (in 102).

Next, the scheduler section 3 checks whether the packet queued last in the scheduling queue 31 is a "premium packet" or a "low priority packet" (in steps 103 and 104). If the packet is a "premium packet", the scheduler section 3 queues, as one piece of data, information representing that the packet is a "premium packet" (information as to which queue in the packet queue group 2 the packet belongs to), the transmission start time information and information on the length of the packet, to the end of the scheduling queue 31 (in a step S105). This is because "premium packets" do not influence each other.

If the packet queued last in the scheduling queue 31 is a "low priority packet", the scheduler section 3 checks whether or not the transmission end time of the "low priority packet" is earlier than the transmission start time of the received "premium packet" based on the transmission start time and the packet length of the "low priority packet" (in steps 106 and 107). If the check result shows that the transmission end time of the "low priority packet" is earlier than the transmission start time of the received "premium packet" (YES in the step S107), the scheduler section 3 queues, as one piece of data, information representing that the packet is a "premium packet", the transmission start time information and information on the length of the packet, at the end of the scheduling queue 31 (in steps 107 and 105). On the other hand, if the transmission end time of the "low priority packet" is later than the transmission start time of the received "premium packet" (NO in the step 107), the scheduler section 3 divides the "low priority packet" into a plurality of packets each having a packet length enabling transmission based on the header format specification of each divided packet which is obtained by the packet division as specified by RFC791. This packet division will now be described.

First, the scheduler 32 calculates a packet length which does not influence the transmission start time of a "premium packet" from the leading part of the "low priority packet", sets the leading part as a divided packet and queues the divided packet again. The scheduler 32 then queues the "premium packet", thereby updating the scheduling queue 31 (in a step 108). At this time, the scheduler 32 memorizes the length of the undivided part (remaining part) of the "low priority packet" and calculates transmission start time (without queuing the undivided part thereof yet).

Next, the scheduler 32 notifies the packet dividing section 4 of the pointer which indicates the position of the low priority packet in the packet buffer 6 and the length of the division. The packet dividing section 4 divides the top of the packet in the packet buffer 6 by the packet dividing method specified by RFC791 using the notified information (in a step 109), and obtains a pointer which indicates the top of the remaining part. The pointer in the low priority packet queue 22 is also updated by dividing the top packet (in a step 110). This division and update are executed by dividing the pointer of the "low priority packet" into the pointer of the divided packet and the pointer of the remaining packet. When the update is completed, the packet dividing section 4 notifies the scheduler 32 of the completion of the division and the pointer which indicates the top of the remaining part.

The scheduler 32 queues, as one piece of data, the pointer which indicates the top of the remaining part of the "low priority packet" notified from the packet dividing section 4, the packet length memorized therein and the calculated transmission start time, thereby updating the scheduling queue 31 (in a step 111). The scheduling is thus completed (in a step 112). The scheduler 32 notifies the packet output section 5 of the queue information (indicating the premium packet queue 21 or the low priority packet queue 22) included in the data at the top of the scheduling queue 31 at output start time, and requests the packet output section 5 to transmit the packet. The packet output section 5 reads the pointer data from the corresponding queue in the packet queue group 2 in accordance with the instruction of this scheduler section 3. The packet output section 5 then reads the packet which corresponds to the pointer data from the packet buffer 6 and outputs the packet. When completing with the output, the packet output section 5 notifies the queue in the packet queue group 2 and the scheduler 32 that the packet has been read. The queue in the packet queue group 2 which is notified of it abandons the data at the top of the queue. In addition, the scheduler 32 abandons the data at the top of the scheduling queue 31. According to this embodiment, it is possible to transmit the "low priority data" without influencing the transmission of the "premium data" and the length of each packet divided from the "low priority packet" is determined dynamically while receiving the "premium packet", so that a band is effectively used.

Figure 3:
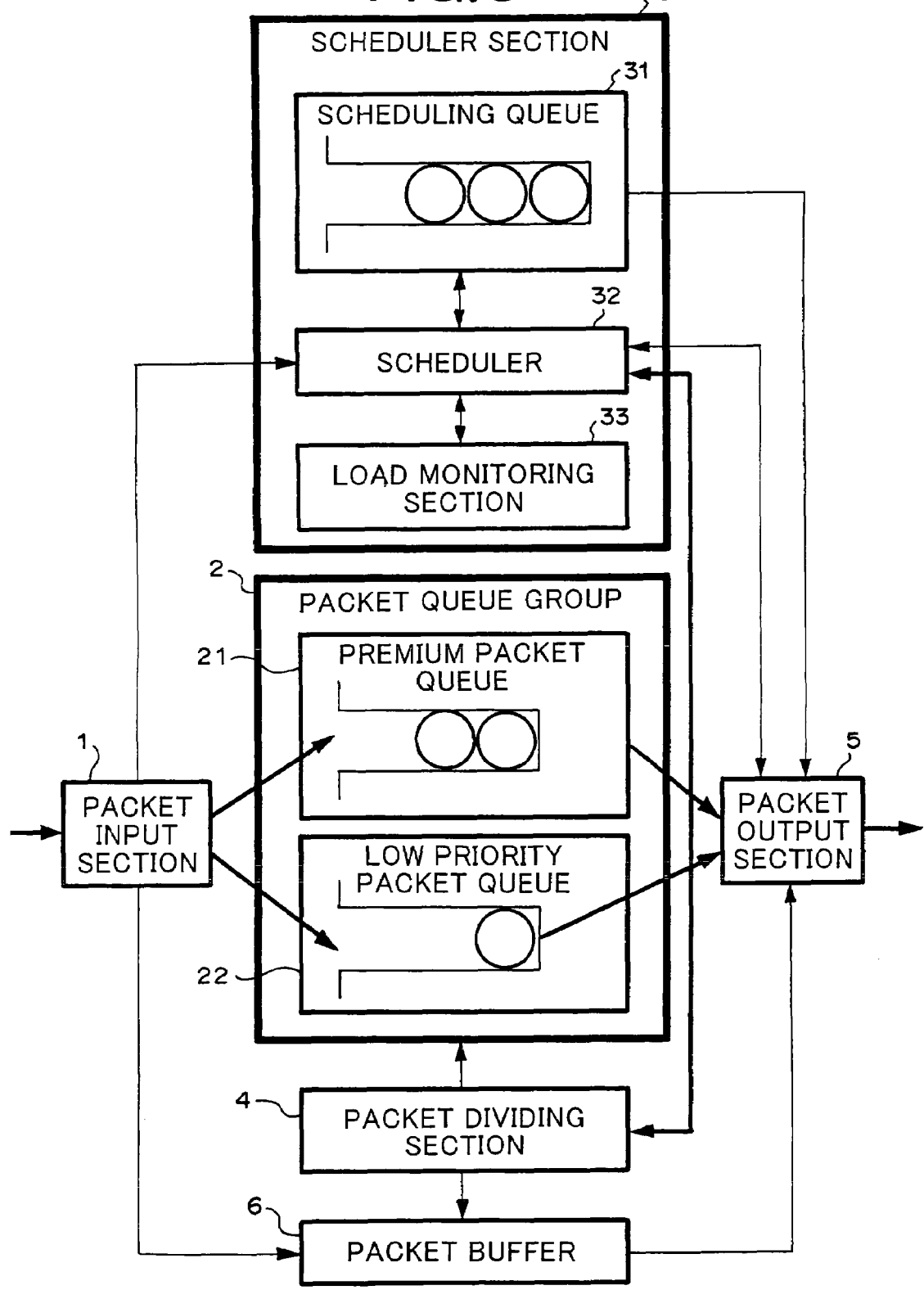
FIG. 3 is a block diagram showing the configuration of a second embodiment of a packet scheduling apparatus according to the present invention.

Next, FIG. 3 is a block diagram showing the configuration of the second embodiment of the packet scheduling apparatus according to the present invention. Referring to FIG. 3, the second embodiment of the packet scheduling apparatus according to the present invention differs from the first embodiment in that a load monitoring section 33 in addition to the configuration shown in FIG. 1 described above is provided. The same constituent elements as those shown in FIG. 1 will not be repeatedly described and the difference of the second embodiment from the first embodiment will be mainly described herein. The load monitoring section 33 always monitors the ratio (load) of a "premium packet" which occupies the output band of the packet output section 5 from information on the "premium packet" input into the scheduler 32, and always notifies the scheduler 32 of the load. If the load is heavy, a "low priority packet" is divided and scheduled. The division is executed in accordance with the fixed length value of each packet divided from the "low priority packet". The fixed length is determined according to a load state in advance (if the load is light, the fixed length is long and if the load is heavy, the fixed length is short).

Figure 4:
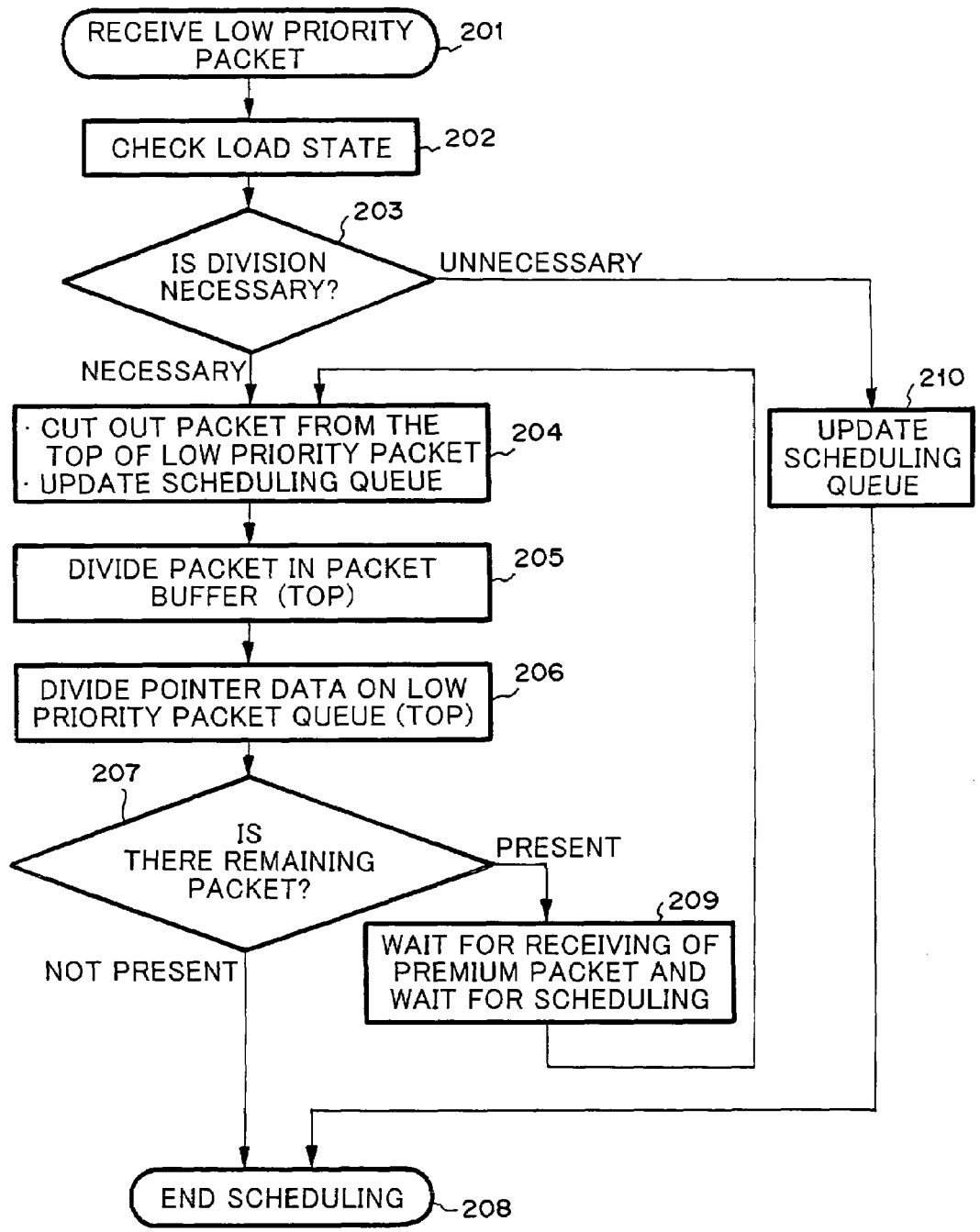
FIG. 4 is a flow chart for explaining the operation of the packet scheduling apparatus shown in FIG. 3.

Next, the operation of the second embodiment of the packet scheduling apparatus according to the present invention shown in FIG. 3 will be described with reference to the flow chart of FIG. 4. The operation from the classification of an IP packet by the packet input section 1 to the transmission of data to the scheduler 32 and the packet queue group 2 is the same as that of the first embodiment stated above.

Scheduling performed by the scheduler section 3 will next be described. If information which the scheduler 32 receives from the packet input section 1 is on a "premium packet", the scheduler section 3 calculates the transmission start time of the received "premium packet" based on a highest packet transmission rate preset to the premium packet queue 21 in advance, packet length information received from the packet input section 1 and the transmission start time and packet length of a previously scheduled "premium packet", and queues, as one piece of data, information representing that the packet is a "premium packet" (information as to which queue in the packet queue group 2 the packet belongs to), the transmission start time information and the packet length information, to the end of the scheduling queue 31.

A case where the information which the scheduler 32 receives from the packet input section 1 is on a "low priority packet" will be described with reference to the flow chart of FIG. 4. The scheduler 32 determines whether or not the "low priority packet" should be divided on the basis of the load information which the scheduler 32 is notified of from the load monitoring section 33 (in steps 202 and 203). If the load state indicates that the division is unnecessary, the scheduler 32 queues the "low priority packet" to the end of the scheduling queue 31, thereby updating the scheduling queue 31 (in a step 210). If the load state indicates that the division is necessary, the scheduler 32 divides the "low priority packet" into a plurality of packets. The difference in operation of the second embodiment from the first embodiment is that the length of each packet divided from the "low priority packet" is determined according to the load.

First, the scheduler 32 divides a packet to get a packet of a length which is determined according to the load in advance from the top of the "low priority packet", queues the divided packet to the end of the scheduling queue 31 and thereby updates the scheduling queue (in a step 204). At this moment, the scheduler 32 stores the length of the undivided part of the packet. The scheduler 32 next notifies the packet dividing section 4 of a pointer which indicates the position of a corresponding "low priority buffer" in the packet buffer 6 and a divided length. The packet dividing section 4 divides the top of the packet in the packet buffer 6 by a packet division method specified by RFC791 using the notified information (in a step 205) and obtains a pointer which indicates the top of the remaining part. Next, the packet dividing section 4 divides the packet at the top and thereby updates a pointer in the low priority packet queue 22 (in a step 206). If having completed with the update, the packet dividing section 4 notifies the scheduler 32 of the completion of the division and the pointer which indicates the top of the remaining part.

The scheduler 32 checks whether or not the division of the "low priority packet" has been completely finished (whether or not there is a remaining part of the packet) after the top of the "low priority packet" has been divided (in a step 207). If there is no remaining part of the packet, the scheduler 32 finishes the scheduling (in a step 208). If there is a remaining part of the packet, the scheduler 32 waits for the receiving of "premium packet" data from the packet input section 1 and performs scheduling after receiving the "premium packet" data (in a step 209). Next, the operation for dividing the packet from the top of the packet in the step 204 is restarted.

This operation is repeated until the division of the "low priority packet" is completely finished. It is noted, however, that once the division starts, the length of each divided packet is not influenced by the load of the "premium packet" until the packet has been completely divided. The scheduler 32 thus finishes the scheduling (in a step 208).

The packet output operation of the packet output section 5 is the same as that in the first embodiment. To be strict, the above-stated scheduling operation does not make the maximum use of the band since the "low priority packet" is divided into packets each having a fixed length determined according to the load in advance. However, it is unnecessary to dynamically calculate the length of the divided packet, as compared with the operation in the first embodiment. As a result, the load of the scheduling itself is decreased. In addition, high rate processing is possible.

In the first embodiment, the scheduler determines whether or not the "low priority packet" which has been already scheduled influences the transmission start time of the "premium packet". If the "low priority packet" influences the transmission start time of the "premium packet", the scheduler divides the "low priority packet" into a plurality of packets and reschedules the divided "low priority packets", the "premium packet" and the remaining "low priority packets" in this order.

In the second embodiment, the scheduler divides a packet into packets having a length determined according to load in advance from the top of the "low priority packet", and queues the divided "low priority packet" to the end of the scheduling queue 3. Thereafter, the scheduler performs the same scheduling to the "low priority packet" and "premium packet" until the remaining "low priority packet" is completely divided.

INDUSTRIAL APPLICABILITY

The present invention is applicable to a case a variable length packet switching system has a packet division (fragmentation) function.

The invention claimed is:

1. A packet scheduling apparatus for scheduling traffic in which a premium packet, belonging to premium traffic which requires real time characteristic, and a low priority packet, belonging to low priority traffic which does not require the real time characteristic, are mingled, comprising:
a packet input section into which the packets are input; a packet buffer to which the packets received by the packet input section are written; a packet queue group which classifies said packets from said packet input section into traffic classes to which respective packets belong and queues the packets in a premium packet queue and a low priority packet queue; a packet dividing section which divides said low priority packet, the division being calculated according to a load state of the premium packets such that the divided low priority packets have a fixed length determined in accordance with the load state; a scheduler section which schedules said packets; and a packet output section which reads said packets scheduled by the scheduler section from said packet buffer, and transmits the scheduled packets, wherein said scheduler section further comprises a packet quality monitoring section which provides notification of a request to change the existing scheduling if the premium packet is input into said packet queue group and it is determined that the low priority packet which has been already scheduled causes a delay or a delay jitter in transmission of the premium packet and deteriorates a required quality of the premium packet.

2. The packet scheduling apparatus according to claim 1, wherein said packet queue group includes the premium packet queue and the low priority packet queue which hold, as data, pointer groups for said premium packets and said low priority packets received from said packet input section, respectively.

3. The packet scheduling apparatus according to claim 1 or 2, wherein said scheduler section includes a scheduling queue in which information on the scheduled packets is queued, and a scheduler which performs scheduling for transmitting the packets based on information received from said packet input section and information received from said packet dividing section.

4. The packet scheduling apparatus according to claim 3, wherein said scheduler holds a maximum transmission rate which is set to said premium packet queue of said packet queue group in advance.

5. The packet scheduling apparatus according to claim 3, wherein said packet input section notifies said scheduler of information as to which queue a pointer is transmitted to, a length of each of the packets and the pointer.

6. The packer scheduling apparatus according to claim 3, wherein said scheduler section further comprises a load monitoring section which monitors a load which is a rate at which said premium packet occupies an output band of said packet output section, on the basis of information on the premium packet input into said scheduler, and which notifies said scheduler of the load.

* * * * *